United States Patent [19]

Spilger et al.

[11] Patent Number: 5,570,254
[45] Date of Patent: Oct. 29, 1996

[54] METHOD AND DEVICE FOR PREVENTING EXCESSIVE CURRENTS IN A WELDING CONVERTER

[75] Inventors: Gerhard Spilger, Beerfelden; Thomas Klinger, Luetzelbach; Dieter Stellwag, Erbach, all of Germany

[73] Assignee: Robert Bosch GmbH, Stuttgart, Germany

[21] Appl. No.: 211,555

[22] PCT Filed: Oct. 15, 1992

[86] PCT No.: PCT/DE92/00862

§ 371 Date: Apr. 7, 1994

§ 102(e) Date: Apr. 7, 1994

[87] PCT Pub. No.: WO93/08628

PCT Pub. Date: Apr. 29, 1993

[30] Foreign Application Priority Data

Oct. 18, 1991 [DE] Germany ............... 41 34 461.8

[51] Int. Cl.$^6$ ..................................... H02H 3/26
[52] U.S. Cl. ................... 361/18; 361/44; 361/45; 361/87; 363/80; 219/130.32
[58] Field of Search ................... 361/18, 42–50, 361/87, 93; 363/37, 41, 80, 127; 219/130.33, 130.31–130.32, 130.51, 110

[56] References Cited

U.S. PATENT DOCUMENTS 5,120,929  6/1992  Kobayashi et al. .............. 219/110
5,196,668  3/1993  Kobayashi et al. .............. 219/110
5,229,567  7/1993  Kobayashi et al. .............. 219/110

FOREIGN PATENT DOCUMENTS 0237861   9/1987   European Pat. Off. .
0244284  11/1987   European Pat. Off. .
2638992   5/1990   France .
3929236   2/1991   Germany .
4009483  10/1991   Germany .

*Primary Examiner*—Jeffrey A. Gaffin
*Assistant Examiner*—Michael J. Sherry
*Attorney, Agent, or Firm*—Spencer & Frank

[57] ABSTRACT

A method for preventing excessive currents in a welding converter that, by use of power semiconductors, generates a two-phase, pulse-width-modulated a.c current from a rectified mains a.c. current supplied to the primary side of a welding transformer. The method includes the following method steps: detecting the current of at least one phase of the primary circuit by a sensor (20); for each detected current signal, forming the time derivation through differentiation according to the time; comparing the time-derived measured signal with a predetermined maximum value; and if the time-derived measured signal exceeds the predetermined maximum value, emitting a signal that leads to deactivation of the power semiconductors (16).

10 Claims, 2 Drawing Sheets

METHOD AND DEVICE FOR PREVENTING EXCESSIVE CURRENTS IN A WELDING CONVERTER

BACKGROUND OF THE INVENTION

The invention is based on a method for preventing excessive currents in a welding converter that generates a two-phase, pulse-width-modulated a.c. current from a rectified mains a.c. current using power semiconductors, which generated current is supplied to the primary side of a welding transformer, as is known in a commercially-available welding machine in which monitoring is provided to prevent excessive current. Also, in this arrangement the magnetization of the welding transformer is adjusted by the control system. Current monitoring is effected from the secondary side of the welding transformer. Because of this, errors in the primary circuit may possibly be falsified or identified too late, which can result in damage to the power semiconductors.

It is an object of the invention to disclose a method and an associated arrangement that permits better protection of the power semiconductor against excessive currents. It is further an object of the invention to disclose an arrangement that permits simplification of the location of the cause of the error when overcurrent occurs in the primary circuit.

SUMMARY OF THE INVENTION

The above object is attained in accordance with the invention by a method for preventing excessive currents in a welding converter that generates a two-phase, pulse-width-modulated a.c. current from a rectified mains a.c. current by means of power semiconductors, which generated current is supplied to the primary side of a welding transformer, comprising the following method steps:

separately detecting the magnitude of each phase of the pulse-width-modulated a.c. current ($I_p$) supplied to the primary side of the welding transformer using respective sensors;

comparing the two current measuring signals of the respective phases of the primary current ($I_p$) that were measured by the sensors with one another;

if the difference between the measuring signals of the two phases exceeds a predetermined peak value, emitting a signal that leads to the deactivation of the power semiconductors;

forming the time derivation for at least one of the two detected current measuring signals, by differentiation according to the time;

comparing the time-derived measuring signal with a predetermined maximum value; and if the time-derived measuring signal exceeds the predetermined maximum value, emitting a signal that leads to the deactivation of the power semiconductors.

The arrangement according to the invention for carrying out by the method responds to an overcurrent within such a short time period that protection of the power semiconductor against destruction is assured. This very rapid response time assures protection of the power semiconductor even in the case of a short-circuit in the primary circuit. The technological realization of the arrangement for executing the proposed monitoring method is effected by means of standard components and standard switching circuits, and can easily be executed by a person skilled in the art. Portions of the individual monitoring functions can advantageously be realized with the aid of software solutions.

In an advantageous manner, the two phases of the primary current are monitored individually. Through continuous comparison of the current behavior in the two phases, effective protection of the power semiconductor results in the case of a short to ground, as does a possibility of finding the cause of the error simply.

In another advantageous feature, the arrangement of the invention permits the prevention of saturation magnetization of the transformer. By means of this, uniform welding performance is assured for the entire duration of welding, which again is beneficial for the welding quality. Excessive primary currents are prevented, as is excessive heating of the transformer. The iron volume of the transformer can therefore be kept to a minimum.

An embodiment of the arrangement is illustrated in the drawing figure and described in detail below.

DETAILED DESCRIPTION OF THE EMBODIMENT

Figure 1:
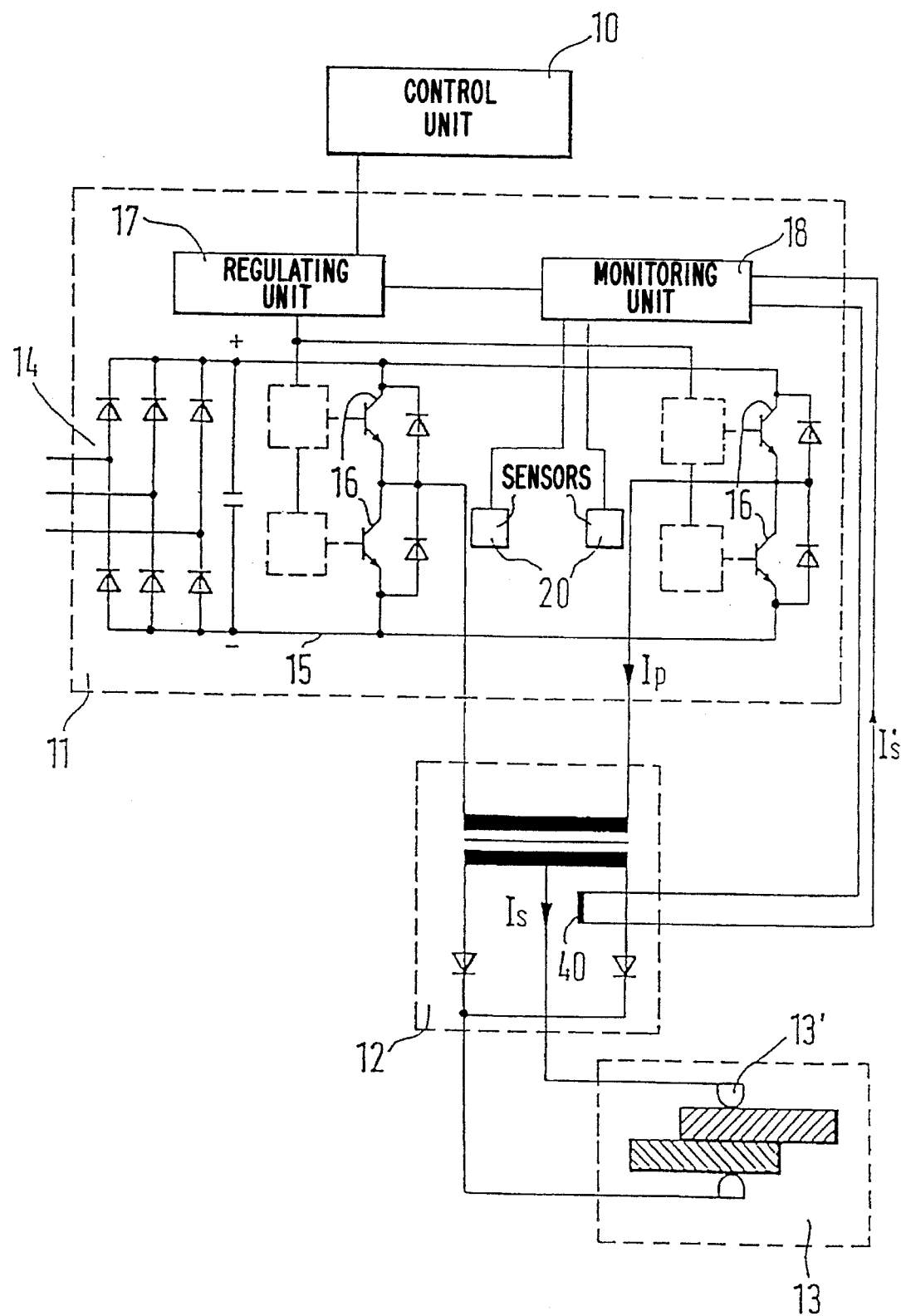
FIG. 1 shows a fundamental representation of a welding converter constructed in accordance with the invention.

FIG. 1 shows the fundamental circuit diagram of a medium-frequency resistance welding system as it is the basis of the invention. The main components of the system are a control unit or device 10, a converter-power stage 11, a welding transformer 12 and a welding device 13. Systems of the type illustrated have long been known, for example from the Miyachi company, in the form of welding machine IS-440B.

The system operates in accordance with the following operating principle:

A three-phase, 50/60 Hz mains a.c. current is rectified in a rectifier unit 14, whose output side forms an intermediate d.c. voltage circuit 15. The intermediate d.c. voltage circuit 15 supplies a power component that serves to generate the pulse-width-modulated a.c. current. The main components of the power element are 4 power semiconductors 16 disposed in an H-bridge circuit and alternatingly actuated by regulating unit 17 to correspond to the desired frequency. A pulse-width-modulated a.c current Ip arises in the power element and is supplied to the primary side of welding transformer 12. Its frequency is preferably within a range between 0.5 and 5 Khz. The a.c. current Is applied to the secondary side of welding transformer 12 is also rectified and supplied to welding device 13 with welding electrodes 13'.

Sensors 20 disposed at the primary circuit continuously detect the magnitude of primary current Ip and deliver the measured actual values to regulating unit 17 via an upstream monitoring device 18.

The detection of welding current Is is effected on the secondary side of welding transformer 12 by means of a coil 40, and measured values Is' are likewise supplied to regulating unit 17 via monitoring unit or device 18. Regulating unit 17 obtains nominal values for current intensity and current duration from control unit 10.

Rapid recognition of a short-circuit in the primary circuit is effected in accordance with the invention with a current-monitoring device disposed directly at the primary circuit. Depending on the circumstances, use is made of the fact that when a short-circuit occurs in the primary circuit, a significant current increase of the primary current Ip occurs because the transformer inductance that counteracts a current increase is omitted. To be able to identify such an increase quickly, it is advantageous to observe the time course dIp/dt of the current. A sensor 20 that detects the actual time course dIp/dt of the current for the relevant phase of the pulse-width-modulated a.c. current is associated with at least one phase line of the pulse-width-modulated current signal, but preferably associated with both in regard to additional application possibilities. Toroidal coils, which do not detect the absolute value of the current, but directly detect its change in time dI/dt, are particularly suited as sensors 20. They are additionally very space-saving. Only one of the output signals of sensors 20 is required for short-circuit monitoring. The corresponding output signal is supplied to monitoring device 18. In this device it is compared with a maximum value that indicates the highest allowable change in current in a predetermined, fixed time interval. In a simple manner, monitoring device 18 is configured as a comparator. If a short-circuit were to occur in the welding circuit, the maximum value would be exceeded by a multiple.

If the change in time dIp/dt in the measured current exceeds the predetermined maximum value, the comparator transmits an error signal to regulating unit 17. Power semiconductors 16 are subsequently immediately blocked so that they cannot sustain any damage. Deactivation takes place very quickly, with attainable times of less than 12 microseconds. In addition, monitoring circuit 18 transmits a signal to control unit 10, due to which the error message "short-circuit in primary circuit" is displayed.

To realize further monitoring functions, the absolute magnitude of primary current Ip is required as an output signal. Therefore, signals emitted by sensors 20 are additionally supplied to integration elements, not shown, which transform the signals representing a change in time into absolute signals through integration. The integration elements are likewise advisably disposed in monitoring device 18.

The current values Ip obtained after integration are first checked for the peak values. Excessive collector currents that could lead to damage of power semiconductors 16 are intended to be thereby avoided. For this purpose, after previous rectification the integrated current measuring values are supplied to a further comparator, in which they are compared with a predetermined maximum value. The comparator is, in a simple manner, again a comparator to whose one input the current measuring value is supplied and to whose other input the predetermined maximum current value is supplied. If a current signal exceeds the predetermined maximum value, monitoring device 18 emits a signal that leads to immediate deactivation of the power semiconductors. Typical maximum current values are within a range of 200–1000 A, depending on the power semiconductors used.

A monitoring function for identifying a short to ground in the primary circuit is realized by means of comparing the absolute values of the currents flowing in the individual phases, which values are obtained after integration. The comparison can be effected by means of forming the difference or by forming the quotient with a predetermined nominal value. In interference-free operation, the obtained comparison value does not change, regardless of how the comparison is performed, or its fluctuates by a fixed value in a narrow tolerance band.

If a short to ground occurs in one phase in the primary circuit, current Ip increases significantly in the respective phase, while the current flowing through the respectively other phase first remains unchanged, or even decreases as a consequence of the current flowing toward ground. Because of this, the current measuring values detected by measuring coils 20 change in their relationship to one another. Again, this is expressed at the output of the comparator, whose output signal is then distinguished from the predetermined, fixed value. A simple and reliable monitoring of the primary circuit for a short to ground can be executed through observation of the relationship to one another of the currents flowing in the individual phases. The realization of a short to ground monitoring circuit is advisably likewise effected inside monitoring device 18. After formation of the difference or the quotient from the measured values of the two coils 20, the actual value obtained in this way is compared with a predeterminable upper limit by means of a comparator. If the actual value exceeds the upper limit, the monitoring device triggers an immediate deactivation of power semiconductors 16 by means of a suitable signal, and a display of the error message "short to ground in primary circuit."

In a further advantageous embodiment of the arrangement in accordance with the invention, welding transformer 12 is monitored for magnetic saturation. The consequence of a transformer being operated in saturation is a significantly increasing current in the primary circuit with simultaneously dropping power transmission via transformer 12. Moreover, excessive heating of the transformer also takes place. A transformer saturation is therefore to be counteracted. For this purpose each pulse of the actual current signal derived from the measured signals by means of sensors 20 is constantly compared with the nominal amplitude value A, which is predetermined by control unit 10, in a further comparator element disposed in monitoring device 18 and likewise not shown. The nominal value is logically applied in the form of an analogous value to the input of a comparator whose other input is supplied with the integrated actual current signal $I_p$. The actual current signal is advisably rectified so that the current pulses of the two polarities can be monitored by a single monitoring device 18.

Figure 2:
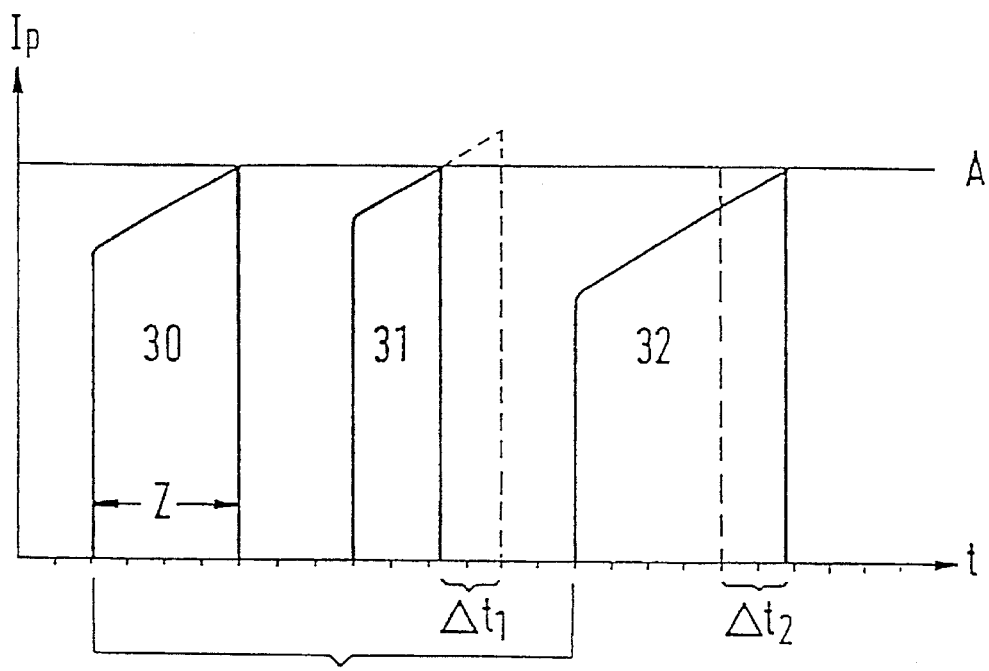
FIG. 2 shows the effect of saturation identification in a current-time diagram.

The following function principle explained below with reference to FIG. 2 is the basis of the saturation monitoring:

Current pulses are started with a fixed frequency of, for example, 1 kHz. In interference-free operation, a pulse of the primary current can be observed in a current-time diagram as closely approximating a rectangle whose two lateral flanks have nearly the same height and that has a gently, constantly ascending top side. If the current reaches the predetermined nominal value, the monitoring device emits a signal that causes the corresponding pulse to break off. In ideal, stable operation, all pulses are of identical length, and the work piece resistance is constant. In practical terms, ideally steady operation is unrealistic. Because of the nearly always nonlinear resistance behavior of the work piece to be welded, the control unit continuously changes the pulse width. If this results in unequal pulse durations of current pulses of opposite polarity saturation conditions of the transformer occur. If the welding transformer may approaches its magnetic saturation, this is expressed in the current-time diagram in a characteristic, additional increase in the current within one pulse. Due to the accelerated increase, current Ip prematurely reaches the predetermined nominal value. When the nominal value is reached, monitoring device 18 triggers the immediate breakoff of the relevant pulse by emitting an appropriate signal. Because of the breakoff, the pulse duration shortens by a time interval $\Delta t_1$ with respect to the anticipated actual value. As a consequence and a function of the degree of saturation, a slowed increase in the current of the opposite polarity stands in contrast to the accelerated increase in the current, dependent above all on a lesser height of the current increase directly after the pulse has been fired. Consequently, such a pulse first reaches the predetermined nominal value at a later point in time. Again, monitoring device 18 emits a signal to break off the relevant pulse when the nominal value is reached. Because of the slowed increase, the duration of the current pulse is lengthened by a time interval $\Delta t_2$.

The behavior of saturation identification is illustrated in FIG. 2 by way of exemplary pulse forms. Shown is current $I_p$ over time axis t. Also, A represents the nominal amplitude value, T the period of the switching frequency of the power semiconductors, Z the duration of an ideal current pulse. Reference numeral 31 represents a current pulse that is shortened by $\Delta t_1$ with respect to duration Z as a consequence of saturation behavior. Shown in dashed lines is a possible course of the current pulse if no limitation were to be effected. Reference numeral 32 represents a flank to be ideally anticipated that drops. Current pulses 30 through 32 are shown rectified.

Because of the unequally long flow over time of currents of opposite polarity, the transformer is magnetically symmetrized with uniform transmitted power. The process is repeated until the transformer is led out of saturation and the duration of the pulses of the primary current signal again corresponds to the nominal pulse duration.

Figure 3:
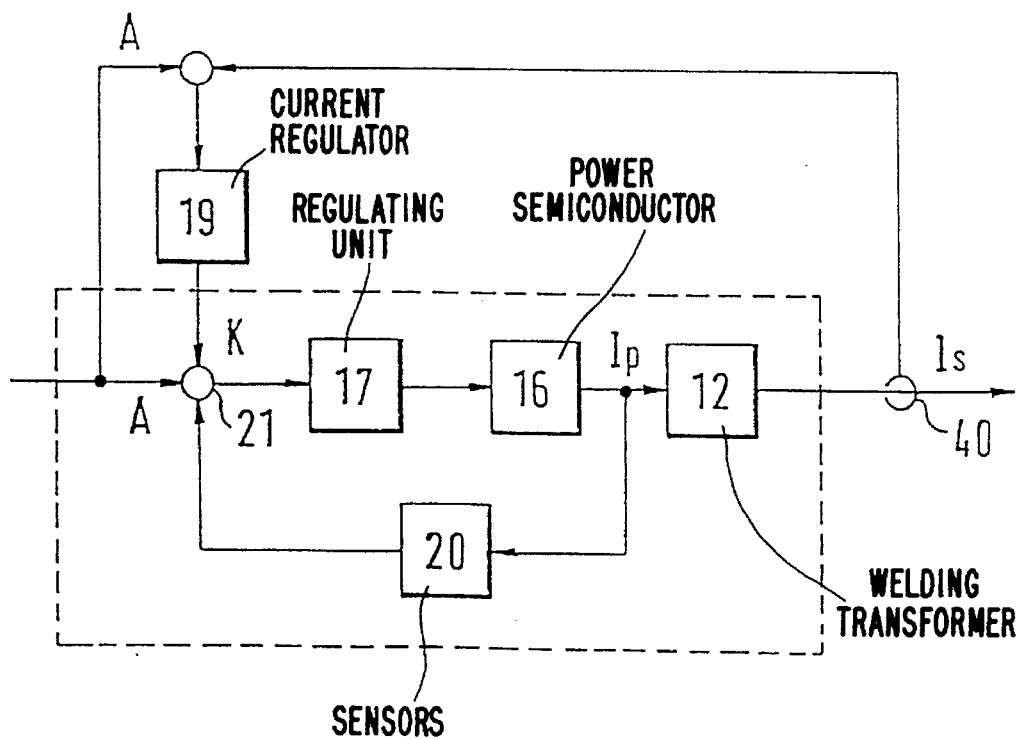
FIG. 3 shows a structural representation of expanded saturation recognition.

A structural representation of a particularly advantageous arrangement for saturation identification is illustrated in FIG. 3. The functional blocks enclosed in dashed lines, regulating unit 17, power semiconductors 16, transformer 12, sensors 20 and summing point 21, represent the above-described structure of saturation identification. In addition, an adjustment signal K, which takes into consideration the behavior of secondary-side current Is, is superposed onto the analogous nominal amplitude value A predetermined by control unit 10. For obtaining a suitable adjustment signal K, it has proven useful to provide a regulating circuit that regulates secondary current Is by means of an I-regulator 19 to the predetermined nominal amplitude value A. The obtained regulating circuit output signal K is added to nominal amplitude value A as an adjustment variable.

The arrangement of all described monitoring functions is advisably effected inside monitoring unit 18. Only standard components and standard switching circuits are necessary for technological realization. The ultimate configuration of the circuit is within the scope of routine activity for one skilled in the art, so that disclosure of details regarding switching technology is not necessary. Portions of the individual monitoring functions can advantageously be realized with the aid of software solutions.

We claim:

1. A resistance welding tool comprising a frequency-converter device, including a rectifying unit, an intermediate DC voltage circuit and a converter comprising power semiconductors, which converter supplies two-phase, positive and negative pulse-width-modulated current pulses to the primary side of a welding transformer; a detector for detecting at least one of the welding current and the welding voltage and for producing a signal corresponding to the welding current; a control apparatus that controls the converter depending on the detected welding current; a respective sensor associated with each phase of the primary current for the separate detection of the current ($I_p$) respectively flowing in each of the phases; and a monitoring unit to which output signals from said sensors are supplied; and wherein the monitoring unit includes means for comparing the output signals of the sensors with one another, a detector circuit which emits a signal which results in the deactivation of the power semiconductors when the difference between the compared measured signals of the two phases is greater than a predetermined peak value, means for forming the time derivation for at least one of the output signals of the sensors, and a comparator by comparing this time derivation with a predetermined peak value and for providing an output signal to the detector circuit to emit a signal that leads to the deactivation of the power semiconductors when the value of the time derivation of the compared measuring signal of the sensor is greater than the predetermined peak value.

2. Arrangement as defined in claim 1, wherein each current sensor directly detects the course in time in the form of the time derivations of the current ($I_p$) flowing in a respective one the two phases.

3. Arrangement as defined in claim 1, wherein each sensor is a toroidal coil.

4. Arrangement as defined in claim 1, further including: an integration stage for integrating the time-derived current measured signals of the sensors included in the monitoring unit and producing output signals which are equivalent to the absolute magnitude of the current ($I_p$); a comparator which compares the signal equivalent to the measured current ($I_p$) with a predetermined nominal value; and means responsive to an output signal from the comparator for breaking off the current pulse that supplies the measuring signal when the current value is greater than or equal to the predetermined nominal value.

5. Method for preventing excessive currents in a welding converter that generates a two-phase, pulse-width-modulated a.c. current from a rectified mains a.c. current using power semiconductors, which generated current is supplied to the primary side of a welding transformer, characterized by the following method steps:

separately detecting the magnitude of each phase of the pulse-width-modulated a.c. current ($I_p$) supplied to the primary side of the welding transformer by respective sensors;

comparing the two current measuring signals of the respective phases of the primary current ($I_p$) measured by the respective sensors with one another;

if the difference between the compared measuring signals of the two phases exceeds a predetermined peak value, emitting a signal that leads to the deactivation of the power semiconductors;

forming the time derivation for at least one detected current measuring signal by differentiation according to the time;

comparing the time-derived measuring signal with a predetermined maximum value; and if the time-derived measuring signal exceeds the predetermined maximum value, emitting a signal that leads to the deactivation of the power semiconductors.

6. Method as defined in claim 5, wherein the time derivations of the pulse-width-modulated s.c. current ($I_p$) supplied to the primary side of the welding transformer are immediately detected by a sensor.

7. Method as defined in claim 5, wherein in the step of comparing the two measuring signals obtained for the phases of the primary current ($I_p$) is effected in the form of the formation of a difference.

8. Method as defined in claim 5, wherein the step of comparing the two measuring signals obtained for the phases of the primary current ($I_p$) is effected in the form of the formation of a ratio.

9. Method as defined in claim 5, further including the following method steps:

triggering the current pulses with a predetermined, fixed repetition frequency;

comparing the measuring signals detected by means of the sensors with a predetermined nominal value for the primary current ($I_p$); and if the measuring signal of the actual current pulse reaches the nominal value, generating a signal that leads to the immediate ending of the pulse.

10. Method as defined in claim 9, wherein the current signals detected by the sensors are of differing polarity and are rectified.

* * * * *